United States Patent [19]

Geesen

[11] 4,224,035
[45] Sep. 23, 1980

[54] METHOD OF SEPARATING SALTS FROM SOLUTION

[75] Inventor: Donald H. Geesen, Wilcox, Canada

[73] Assignee: PPG Industries Canada Ltd., Regina, Canada

[21] Appl. No.: 892,452

[22] Filed: Apr. 3, 1978

[51] Int. Cl.² ............................................. B01D 9/02
[52] U.S. Cl. .................................. 23/296; 23/302 R; 23/303
[58] Field of Search ............ 23/296, 298, 303, 302 T, 23/302 R; 159/47 R, 17 R, DIG. 8

[56] References Cited

U.S. PATENT DOCUMENTS

| | | | |
|---|---|---|---|
| 1,216,187 | 2/1917 | Trump | 23/296 |
| 3,204,688 | 9/1965 | Hildyard | 159/47 R |
| 3,365,278 | 1/1968 | Kelly et al. | 23/296 |
| 3,433,603 | 3/1969 | Jeffery | 23/300 |
| 3,530,924 | 9/1970 | Domning | 159/47 R |
| 3,704,101 | 11/1972 | Kelly | 23/296 |

Primary Examiner—Hiram H. Bernstein
Attorney, Agent, or Firm—Walter M. Benjamin

[57] ABSTRACT

Disclosed is an improved method of separating a first salt and a second salt from an aqueous solution containing both salts and salt impurities, where the solubility of the first salt increases more with increasing temperatures than the solubility of the second salt, and at least a portion of the salt impurities precipitates as slower settling rate crystals than the settling rate of precipitated second salt. The solution is passed through a series of evaporators in which second salt and salt impurities are precipitated. The bottom of each evaporator communicates with an elutriation leg into which precipitated salts settle, and into which a fluidizing liquid is introduced to carry precipitated salt impurities back to the evaporators and from which second salt slurry is withdrawn. In the improved method, evaporator mother liquor effluent overflow having a temperature and salt composition near the temperature and salt composition of the solution in the evaporator communicating with the elutriation leg into which the fluidizing liquid is introduced is utilized as a fluidizing liquid (elutriant) in the potassium chloride recovery step.

13 Claims, 3 Drawing Figures

METHOD OF SEPARATING SALTS FROM SOLUTION

BACKGROUND OF THE INVENTION

This invention relates to separating a first salt and a second salt from an aqueous solution containing both salts, the solubility of the first salt increasing more with increasing temperature than the solubility of the second salt. More particularly this invention relates to separating these salts from an aqueous solution containing those salts and salt impurities by passing the solution through a series of evaporators.

Salts having a solubility increasing with increasing temperatures within a given temperature range, e.g., potassium chloride, hereinafter called the first salts, and salts having a solubility relatively unchanged or decreasing with increasing temperatures within that same temperature range, e.g., sodium chloride, hereinafter called second salts, are frequently found in mixtures in naturally occurring ores. In a recognized method of producing the salts, these ores are dissolved in a suitable aqueous solvent, thereby forming a solution from which the salts can be easily separated. Admixtures of these salts in solution may also arise during the course of some industrial chemical production, e.g., electrolysis of electrolytes.

The first and second salts are separated by concentrating the solution by evaporation until the "invariant composition" is approached or reached. By "invariant composition" is meant a composition at which a solution at a given temperature is saturated with two or more salts. Thus, for an invariant composition in the instant case the solution is saturated with respect to the first and second salt. The evaporation is carried out at such a temperature that the second salt is selectively precipitated (owing to the relative solubilities of the salts) and removed as the invariant composition is approached. Accordingly, evaporation at incrementally higher temperatures can deplete the solution of the second salt while concentrating the solution with respect to the first salt without precipitating the first salt. The second salt depleted solution is then forwarded to a first salt recovery step where the first salt is removed from the solution, e.g., by incrementally cooling the solution to selectively precipitate the first salt (again, owing to the relative solubilities of the salts).

Naturally occurring brines, solution mined ore, or dissolved shaft or room and pillar mined ore containing potassium chloride, for example, can be treated by the above described process for the recovery of potassium chloride (first salt) principally and sodium chloride (second salt) secondarily. Usually, these potassium chloride-containing ores contain significant amounts of impurities such as magnesium chloride, calcium carbonate, magnesium sulfate, calcium chloride, calcium sulfate, and sodium sulfate. Significant amounts of impurities, e.g., sodium sulfate and calcium sulfate, are precipitated along with sodium chloride during the evaporation step. Also, the presence of a few parts per hundred parts of water of an impurity, such as magnesium chloride will lower the invariant composition of a potassium chloride-sodium chloride solution by a few parts each of potassium chloride and sodium chloride per hundred parts of water, thereby lowering the temperature at which the invariant composition is reached during the evaporation step.

In an industrial method, separation of potassium chloride and sodium chloride from an aqueous solution containing both salts is effected by multiple effect evaporation operated at progressively higher temperatures in the direction of the flow of the solution, often described as backward feed; that is, mother liquor effluent overflow from cooler effects is forwarded to hotter effects. A typical evaporator effect for purposes of concentrating salts, comprises an evaporator communicating with an elutriation leg. As the solution passes through each effect, water is removed and the solution becomes concentrated with respect to potassium chloride while precipitating some salt impurities and sodium chloride which settles into the elutriation leg. Sodium chloride is precipitated in each evaporator effect until the solution approaches or reaches its invariant composition for the temperature at which each evaporator effect is operated.

These evaporator effects are heated in a direction opposite to the direction of the flow of the solution to be concentrated. The first effect is heated by introducing steam from an external source, such as a boiler, and successively higher effects are heated by the vapors from the preceding effects progressively to the last evaporator effect wherefrom vapor is forwarded to a cooling tower. By operating the evaporators in this multiple effect manner, greater efficiency is achieved through more product recovery and greater steam economy.

The first evaporator effect mother liquor effluent overflow, which is concentrated with respect to potassium chloride, is forwarded to a potassium chloride recovery step. The recovery step is commonly a series of crystallizers in which the first effect mother liquor effluent is cooled to precipitate potassium chloride. Due to the aforedescribed solubility characteristic of sodium chloride, the potassium chloride crystallized is recovered nearly free of precipitated sodium chloride.

The effluent from the potassium chloride recovery step may be depleted to low potassium chloride levels, e.g., by refrigerative crystallization methods. The potassium chloride content of the effluent from the potassium chloride recovery step can be depleted to about 8 parts potassium chloride per 100 parts water, or lower. Part of this effluent can be purged before reintroduction into the evaporators to avoid increases in salt impurity levels above an undesirable amount, e.g., greater than about 4 percent salt impurities by weight.

As stated above, significant amounts of impurities precipitate along with sodium chloride. These precipitated impurities settle to the bottom of the evaporator and into the elutriation leg in communication therewith. In the above described evaporation, sodium chloride crystals are larger (faster settling rate crystals) than essentially all of the crystals of the salt impurities. Therefore, most of the impurities entering the elutriation leg may be fluidized by introducing a liquid at the lower portion of the elutriation leg to effect a net liquid upward flow countercurrent to the settling solids (often described as elutriating). The rate at which the elutriating liquid rises is such that substantially all of the fine particle impurities are carried back up into the evaporator and forwarded to subsequent evaporators along with the mother liquor effluent overflow forwarded thereto, while sodium chloride crystals are allowed to settle to the bottom of the elutriation leg for removal therefrom as relatively pure crystals.

The mother liquor effluent overflow from the first effect evaporator, which contains a significant amount of fluidized impurities, may be forwarded to a zone where the impurities are removed, such as in a settling zone operated at quiescent conditions. Upon the addition of flocculating agents to the settling zone, the flocculated settled particles easily removed. Then, the mother liquor therefrom is forwarded to the potassium chloride recovery step.

As stated above, the impurities settling in the elutriation legs are fluidized by a liquid introduced near or at the bottom of the elutriation legs. The liquids so utilized are the raw feed solution or the mother liquor effluent from the potassium chloride recovery step. The raw feed solution is used to fluidize the cooler evaporator effects while the mother liquor effluent from the potassium chloride recovery step is used to fluidize the hotter evaporator effects, thereby providing fluidizing liquids at or near the operating temperature of the evaporator effect being fluidized (See, for example, U.S. Pat. No. 3,365,278 and U.S. Pat. No. 3,704,101). The temperature of these fluidizing streams may be adjusted by some heat exchange mechanism before the fluidizing liquid is introduced into the evaporator effects, thereby improving steam economy. However, not only is it desired that the fluidizing liquid be of a compatible temperature with the liquid in the evaporator effect, but it is also desired that the fluidizing liquid be of a compatible salt composition with the solution in the evaporator effect. However, neither the raw feed solution nor first salt recovery step mother liquor effluent satisfies this compatibility composition requirements for all the evaporator effects. It is, therefore, a desideratum that a liquid with temperature and salt composition compatibility be available as an elutriant.

SUMMARY OF THE INVENTION

It has been found that there is an improved method of separating a first salt and a second salt from an aqueous solution containing both salts and salt impurities that precipitate into slower settling rate crystals than the settling rate of precipitated second salt. The separation is effected by passing the solution through a series of evaporators, each of which communicates with an elutriation leg. The second salt and salt impurities are precipitated in each evaporator while fluidizing liquid is introduced upwardly through the elutriation leg of each evaporator to carry the impurities back up into the evaporator so relatively pure second salt slurry can be withdrawn from each elutriation leg. Evaporator mother liquor effluent overflow is utilized as the elutriating liquid to provide a fluidizing liquid having a temperature and salt composition near the temperature and salt composition of the solution in the evaporator communicating with the elutriation leg into which the fluidizing liquid is introduced. In a preferred embodiment, the evaporators are multiple effect evaporators operated at progressively higher temperatures and having backward feed.

This improvement allows utilization of a fluidizing liquid which is at a compatible temperature and composition without adjusting the temperature or composition thereof. Moreover, the mother liquor effluent from the first salt recovery step can be reduced to low first salt depletion and as a consequence made available for uses other than elutriation, e.g., (in a potassium chloride-sodium chloride system to redissolve potassium chloride containing ore) to provide a closed loop system whereby very little if any purge of first salt recovery step mother liquor effluent is necessary.

Further, this improvement is preferred for use in cases where second salt slurry withdrawn from the elutriated evaporator is recycled (See co-assigned, co-pending U.S. patent application, Ser. No. 892,454, filed Apr. 3, 1978 back to the evaporator from which mother liquor effluent overflow supplying the elutriating fluidizing liquid is taken. As a consequence of these conditions, there is increased energy efficiency accomplished through the three following factors. First, the amount of elutriation liquor flowing upwardly into the evaporator need not be minimized. This is possible because excess elutriation liquor entering the evaporator is liquor that would have been fed to the evaporator via the overflow. Hence, the heat energy lost accruing to additional heat required to concentrate a cooler less concentrated elutriating liquid is avoided. Second, the portion of elutriating liquid used as second salt slurry mother liquor is returned to the evaporator effect from whence it came. Therefore, there is no resulting loss of heat supplied to the elutriating liquid. Third, channeling of mother liquor from the elutriated evaporator to the bottom of the elutriation leg is minimized since a sufficient amount of elutriation liquid can be used to avoid this phenomenon owing to the aforesaid first factor.

This invention is particularly useful for producing potassium chloride and sodium chloride from solution mined potassium chloride and sodium chloride-containing ore. Since there is a high cost associated with solution mining the ore, it is imperative that as much potassium chloride that is economically practicable is produced and that a closed loop system is provided, thereby minimizing the amount of fresh water required for addition into the system. Accordingly, this invention allows for the mother liquor effluent of the potassium chloride recovery step to be depleted of potassium chloride content too low for recycle back to the evaporation step and low enough for use as a solvent for further solution mining, thereby eliminating the requirement for purging a portion of the first salt recovery step mother liquor effluent. This is possible because use of the potassium chloride recovery step mother liquor effluent for further solution mining is a natural purge due to the progressively greater quantities thereof required for solution mining potassium chloride in expanding subterranean cavities.

BRIEF DESCRIPTION OF THE DRAWINGS

Further objects and advantages will become clear and apparent to those skilled in the art by the detailed description and illustration made below with reference to the drawings in which.

DETAILED DESCRIPTION OF THE INVENTION

Figure 1:
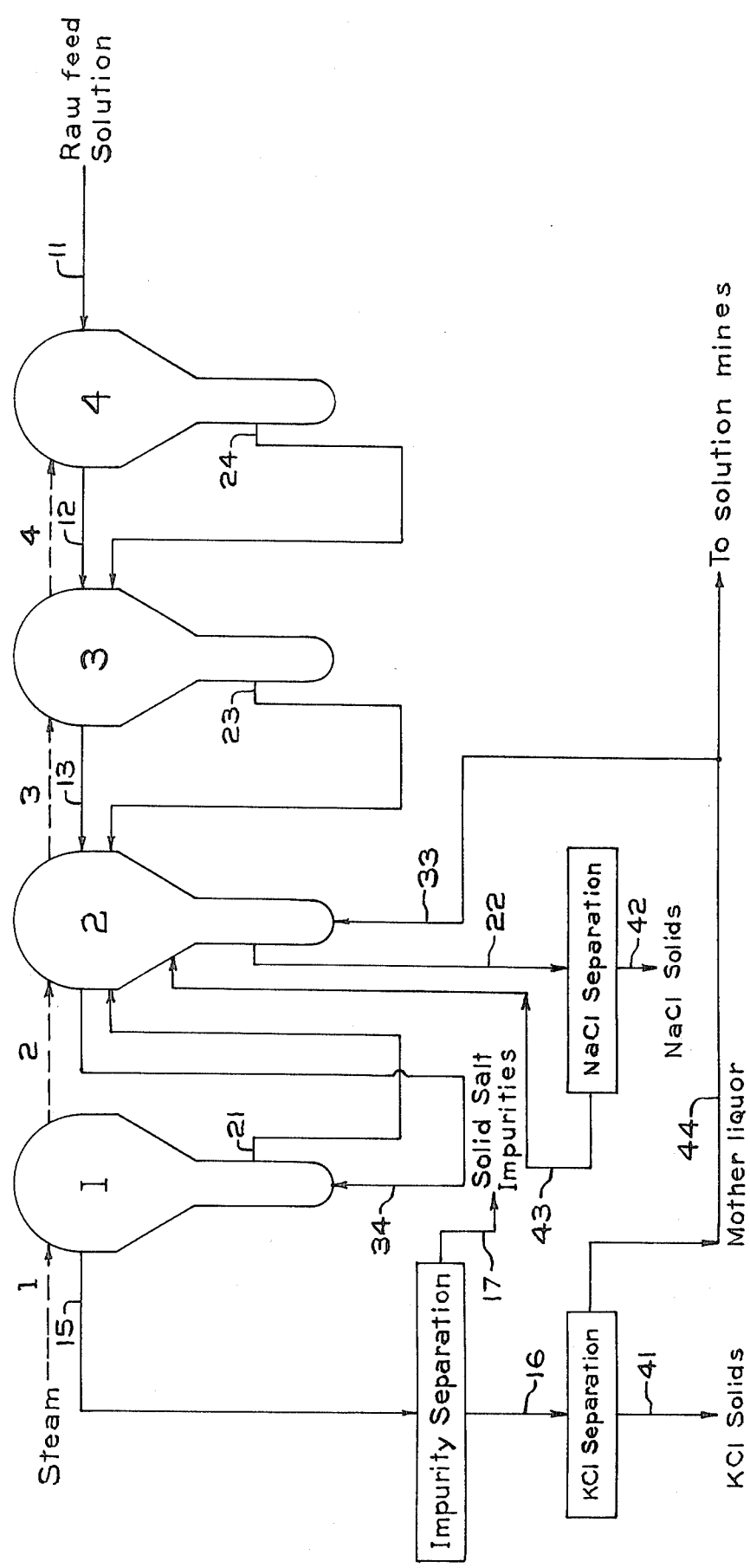
FIG. 1 is a diagram showing a multiple effect evaporation system comprising 4 evaporator effects wherein the mother liquor effluent overflow from the second evaporator effect is utilized to elutriate the first evaporator effect.

According to the present invention, first and second salts may be separated from an aqueous solution containing both salts and salt impurities in solution. The first salt may be any salt which has a solubility increasing with increasing solution temperature within a given temperature range. Accordingly, first salt include salts such as potassium chloride, magnesium chloride, sodium carbonate, and sodium chlorate. The second salt may be any salt which does not form a compound with the first salt and which has a solubility increasing less with increasing temperatures (1) within the temperature range at which the solubility of the first salt increases with increasing temperatures and (2) within the temperature range at which the evaporation is to be carried out. No significant increase in solubility of the second salt occurs with increasing temperatures so that an increase in solution temperature will increase the solubility of the second salt much less than the increase in temperature will increase the solubility of the first salt. Therefore, it is contemplated within the scope of this invention that second salts include salts that have a solubility which decreases with increasing solution temperatures. Accordingly, second salts include sodium chloride, calcium sulfate, and magnesium sulfate.

In a preferred embodiment, the solution is subjected to multiple effect evaporation operated at progressively higher temperatures so that the solution is concentrated with respect to the first salt while precipitating the second salt. The precipitating salt impurities are fluidized by a liquid introduced into an elutriation leg in communication with the bottom of each evaporator effect. This fluidizing liquid provides an upward flow of liquid in the evaporator vessel. The upward flow carries the salt impurities crystals upward while allowing larger second salt crystals to settle. The mother liquor effluent overflow from each evaporator effect described as overflow liquor is withdrawn from each evaporator effect and forwarded to the successive-hotter evaporator effect. The mother liquor effluent overflow from the hottest evaporator effect (first effect evaporator) is forwarded to a salt impurities settling step and then to the first salt recovery step. Consequently, virtually all of the salt impurities are carried to the successive evaporator effect along with overflow liquor and eventually to the salt impurities settling step where they are removed from the liquor. A relatively pure second salt slurry is removed from the bottom of each evaporator effect.

The solution treated by the present invention contains salt impurities which precipitate at conditions the second salt precipitates (at least some of the salt impurities have characteristics similar to that of second salts). The salt impurities should not affect the hereinbefore described solubility characteristics of the first and second salts. These salt impurities may be in high concentration (e.g., up to about 5 percent by weight) so long as it is possible to maintain conditions whereby the salt impurities are limited to smaller crystal growth (slower settling rate crystals) than that of the second salt crystals. This is made possible by methods well-known in the crystallizing art. Since for a given rate of crystal production, the size of the product crystals is inversely proportional to the number of growing crystals, a common method would be to remove crystals from the vessel in such a manner that the salt impurity crystals experience short residence times in each evaporator while a bed of second salt crystals are maintained in the elutriation leg so that the solution will have a potential to precipitate second salt on growing second salt crystals. Other methods known in the art may be utilized, such as controlling the rate at which the salts become supersaturated in the solution so that the second salt is supersaturated at a slower rate than the salt impurities become supersaturated.

According to the present invention, evaporator effects are elutriated with mother liquor effluent overflow from the preceding evaporator effect. The last (coldest) evaporator effect is elutriated with raw feed solution. The size of the elutriation leg is chosen so that no more than the total amount of overflow from the preceding evaporator effect is necessary to elutriate and so precipitated second salt can be removed at the same rate it precipitates. Preferably, the size of the elutriation leg is as small as possible for handling the volume of second salt precipitated and so that most of the mother liquor effluent from the preceding evaporator is forwarded directly to the elutriated evaporator as feed rather than as an elutriation liquid. This allows better salt impurities removal, since crystal of salt impurities introduced with overflow feed are introduced near the top of the evaporator where they are removed after a shorter residence time than the residence time the salt impurities experience when they must rise with upward flowing elutriating liquid.

Second salt slurry withdrawn from the elutriated evaporator may be forwarded to the successive-hotter evaporator or recycled to the preceding-cooler evaporator depending upon conditions as taught by U.S. Pat. No. 3,704,101 and said co-assigned, co-pending application, Ser. No. 892,454. This second salt slurry is introduced into either evaporator effect at a point where precipitated first salt crystals can dissolve, second salt crystals can settle and salt impurities can be fluidized to be removed with mother liquor effluent overflow.

The evaporator effect, from which withdrawn second salt slurry is purged from the evaporation system and forwarded to a second salt recovery step, should be elutriated with a liquid free of salt impurities content so that the second salt slurry mother liquor will be essentially free of salt impurities (i.e., that evaporator effect is elutriated with first salt recovery step mother liquor effluent or raw feed solution). Thus, the second salt can be produced as a co-product in a second salt recovery step and will be essentially free of salt impurities. It is, therefore, preferred that the second salt slurry from which second salt is recovered be withdrawn from the last (coldest) evaporator effect because the last evaporator effect yields the most pure second salt slurry. The last evaporator effect can be elutriated with raw feed solution and consequently there is no need for the first salt recovery step mother liquor effluent to be utilized as an elutriating liquid. The first salt recovery step mother liquor may be utilized for other purposes beneficial to the process, e.g., the first salt recovery step mother liquor may be used to further dissolve first salt-second salt admixtures for evaporation treatment.

In a preferred embodiment of this invention, potassium chloride and sodium chloride is recovered from an aqueous solution containing both salts and salt impurities such as sodium sulfate, calcium sulfate, magnesium sulfate, calcium carbonate, magnesium chloride, and calcium chloride. The solution is passed through multiple effect evaporators wherein the solution is concentrated with respect to potassium chloride while precipitating sodium chloride and a portion of the salt impurities. The precipitated sodium chloride settles into an elutriation leg in communication with the bottom of the evaporator and is recovered relatively pure by fluidizing the precipitated salt impurities. The salt impurities are separated from the mother liquor effluent of the evaporation treatment. As an aid in separating the salt impurities from the evaporation step mother liquor, floculating agents can be added to the solution.

In the evaporators, sodium chloride crystals are precipitated into larger faster settling rate crystals than the crystals of the precipitated salt impurities principally by maintaining therein a sodium chloride slurry density ranging between 20 and 50 percent while crystal of salt impurities are removed after a short residence time. Also, since some of the impurities have a solubility which decreases with increasing temperature, and sodium chloride has a solubility which is relatively unchanged with increasing temperatures, a fast evaporating rate causes smaller salt impurities crystal production than sodium chloride crystal production. This is, the proliferation of nuclei of salt impurity crystals influences small crystal growth because of the large number of nuclei upon which there is for growth to occur.

Due to fluctuation in feed concentrations as taught by U.S. Pat. No. 3,704,101 and due to the desirability of the first effect (hottest) evaporator operating at 100 percent saturation with respect to potassium chloride as taught by said co-assigned, co-pending application Ser. No. 892,454 it is preferred that sodium chloride slurries forwarded to the sodium chloride recovery step be withdrawn from intermediate evaporator effects instead of the first or last evaporator effect. Thus, according to the hereinbefore description of this invention, these intermediate evaporator effects are elutriated with mother liquor effluent from the potassium chloride recovery step instead of mother liquor effluent overflow from another evaporator effect.

However, in cases where there are initally no concentration fluctuations in the raw feed solutions, or the potassium chloride concentration in the feed solution is high and where the potassium chloride content of the solution is reduced to very low levels in the potassium chloride recovery step, e.g., below about 14 parts potassium chloride per 100 parts water, it is preferred that the last (coldest) evaporator effect supply the sodium chloride slurry for the sodium chloride recovery step. Thus, the benefits of said co-assigned, co-pending application, Ser. No. 892,454 are realized. Moreover, the mother liquor effluent from the potassium chloride recovery step can be utilized as a solvent for further potassium chloride-sodium chloride dissolution, particularly for solution mining. Thus, a closed loop system is provided minimizing the amount of fresh water needed to be added to the system. No potassium chloride recovery step mother liquor effluent purge would be required owing to salt impurities accumulation because further dissolving of potassium chloride-sodium chloride acts as a purge due to the increasing size of a solution mined cavity.

If potassium chloride recovery step mother liquor is used for elutriation, it is preferred that the elutriation leg be as small as possible to accomodate precipitated sodium chloride and to fluidize the salt impurities so that the maximum amount of remainder mother liquor can be utilized as a solvent for further potassium chloride-sodium chloride dissolution.

Figure 2:
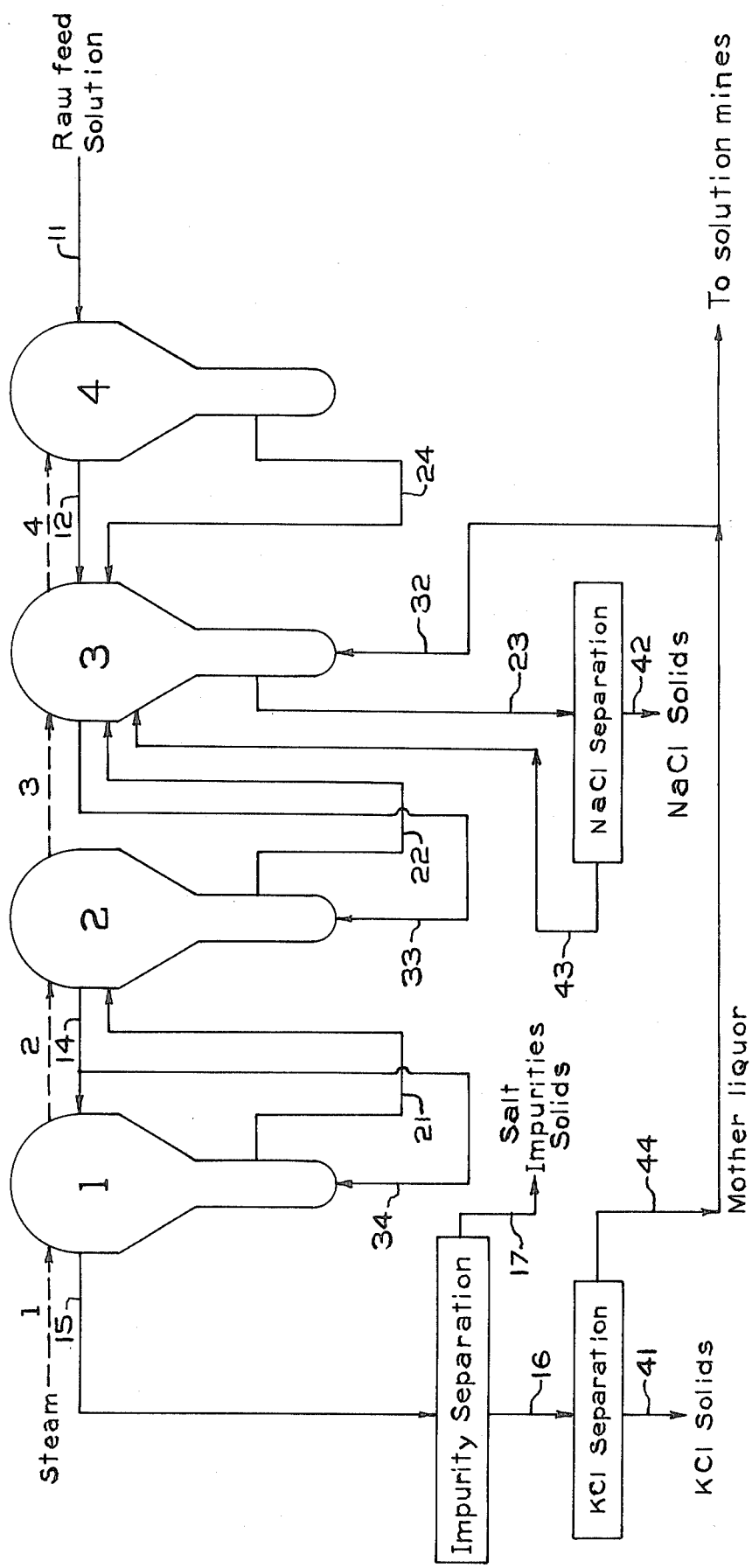
FIG. 2 is a diagram showing a multiple effect evaporator system comprising 4 evaporator effects wherein the mother liquor effluent overflows from the second and third evaporator effects are utilized to elutriate the first and second evaporator effects, respectively.
Figure 3:
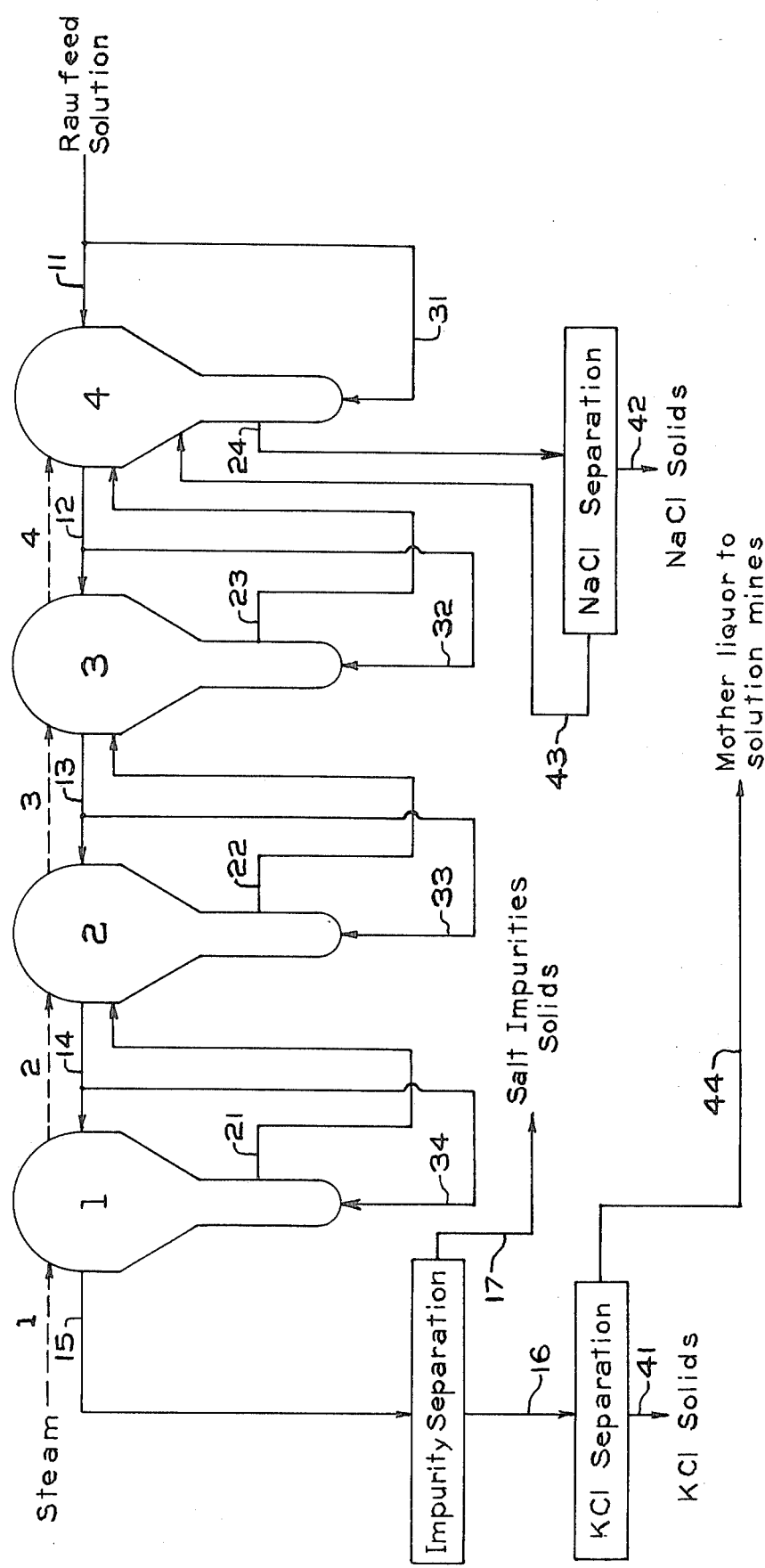
FIG. 3 is a diagram showing a multiple effect evaporator system comprising 4 evaporator effects wherein the mother liquor effluent overflows from the fourth, third, and second evaporator effects are utilized to elutriate the third, second, and first evaporator effects, respectively.

Reference is now made to FIGS. 1, 2, and 3 which depict the methods of withdrawing sodium chloride slurry from the second, third, and fourth effect evaporators respectively for a 4 effect evaporation system, wherein the withdrawn slurry is forwarded to a sodium chloride recovery step. In each figure raw feed is introduced to the 4th evaporator effect via stream 11. Mother liquor effluent overflow from the 1st evaporator effect is forwarded to a solid salt impurities separation step via stream 15. Solid salt impurities are purged therefrom via stream 17. Mother liquor effluent from the solid salt impurities separation step is forwarded to a potassium chloride recovery step via stream 16. Potassium chloride solids are produced therefrom via stream 41. Mother liquor from the potassium chloride recovery step, stream 44, is forwarded to solution mines for further one dissolution. Sodium chloride solids are produced from the sodium chloride recovery step via stream 42. The 1st evaporator effect is heated by steam via stream 1. The 2nd, 3rd, and 4th evaporators are heated by the vapors from the 1st, 2nd, and 3rd effect evaporators, respectively, via streams 2, 3, and 4, respectively.

Reference is now made to FIG. 1 which illustrates an embodiment where sodium chloride slurry withdrawn from the 2nd evaporator effect is forwarded to the sodium chloride recovery step via stream 22. Mother liquor effluent from the sodium chloride recovery step is therefore recycled back to the 2nd evaporator effect via stream 43. A portion of mother liquor effluent from the potassium chloride recovery step, stream 44, is recycled to elutriate the 2nd evaporator effect via stream 33. The remainder of stream 44 is recycled to solution mines. The 1st evaporator effect is elutriated with mother liquor effluent overflow from the second evaporator effect via stream 34. Sodium chloride slurries withdrawn from the 1st, 3rd, and 4th evaporator effects are fed into the 2nd and 3rd evaporator effects via streams 21, 23, and 24, respectively, as shown.

Reference is now made to FIG. 2 which illustrates an embodiment where withdrawn sodium chloride slurry from the 3rd evaporator effect is forwarded to the sodium chloride recovery step via stream 23. The mother liquor effluent from the sodium chloride recovery step is recycled to the 3rd evaporator effect via stream 43. The 3rd evaporator effect is elutriated with a portion of the potassium chloride recovery step mother liquor, stream 44, via stream 32. The remainder of stream 44 is recycled to the solution mines. The 1st and 2nd evaporator effects are elutriated with mother liquor effluent overflows from the 2nd and 3rd evaporator effects via streams 14 and 34, and 33 respectively. Sodium chloride slurries withdrawn from the 1st, 2nd, and 4th evaporator effects are fed into the 2nd and 3rd evaporator effects via streams 21, 22, and 24, respectively.

Reference is now made to FIG. 3 which illustrates an embodiment where withdrawn sodium chloride slurry from the 4th evaporator effect is forwarded to the sodium chloride recovery step via stream 24. The mother liquor effluent from the sodium chloride recovery step is recycled to the 4th evaporator effect via stream 43. The 1st, 2nd, and 3rd evaporator effects are elutriated with mother liquor effluent overflows from the 2nd, 3rd, and 4th evaporator effects via streams 14 and 34, 13 and 33, and 12 and 32, respectively. A portion of the raw feed solution elutriates the 4th evaporator effect via stream 31. The sodium chloride slurries withdrawn from the 1st, 2nd, and 3rd evaporator effects are recycled to the 2nd, 3rd, and 4th evaporator effects via streams 21, 22, and 23, respectively. All of stream 44 is recycled to the solution mines.

Thus, it can be seen that mother liquor effluent overflow can be utilized as an elutriating liquid. It is also apparent that mother liquor effluent overflows from preceding cooler evaporators have a temperature and salt composition compatible with the temperature and salt composition of the evaporator into which the overflow elutriant is introduced. It is also apparent that no other stream disclosed would be as compatible without upsetting steam economy.

While the present invention has been described by reference to certain details of specific embodiments, it is not intended that the invention be construed as limited thereto, except insofar as such details are recited in the claims hereof.

I claim:

1. In the method of separating a first salt and a second salt from an aqueous solution containing both salts and salt impurities, the solubility of the first salt increasing more with increasing temperatures than the solubility of the second salt, at least a portion of the salt impurities precipitating as crystals with a slower settling rate than that of precipitated second salt, by passing the solution through a series of evaporators, wherein second salt and salt impurities are precipitated in each evaporator, the bottom of each evaporator communicating with an elutriation leg, introducing fluidizing liquid upwardly through the elutriation legs to carry the impurities back to the evaporators while precipitated second salt settles, and withdrawing second salt slurry from each elutriation leg, the improvement which comprises utilizing as the fluidizing liquid evaporator mother liquor effluent overflow having a temperature and salt composition near the temperature and salt composition of the solution in the evaporator communicating with the elutriation leg into which the fluidizing liquid is introduced.

2. The method of claim 1, wherein the first salt is potassium chloride and the second salt is sodium chloride.

3. The method of claim 1, wherein the series of evaporators is multiple effect evaporators operated at progressively higher temperatures, wherein the multiple effect evaporators are backward fed, wherein the 1st evaporator effect is the hottest and wherein the mother liquor effluent overflow from the 2nd evaporator effect is utilized as the fluidizing liquid introduced into the elutriation leg communicating with the 1st evaporator effect.

4. The method of claim 1, wherein the series of evaporators is four multiple effect evaporators operated at progressively higher temperatures, wherein the multiple effect evaporators are backward fed, wherein the 1st evaporator effect is the hottest and wherein mother liquor effluent overflow from the 2nd and 3rd evaporator effects are utilized as the elutriating liquid introduced into the elutriation leg communicating with the 1st and 2nd evaporator effects, respectively.

5. The method of claim 1, wherein the series of evaporators is four multiple effect evaporators operated at progressively higher temperatures, wherein the multiple effect evaporators are backward fed, wherein the 1st evaporator effect is the hottest and wherein the mother liquor effluent overflow from the 2nd, 3rd, and 4th evaporator effects are utilized as elutriating liquid introduced into the elutriation legs communicating with the 1st, 2nd, and 3rd evaporator effects, respectively.

6. In the method of separating a first salt and a second salt from an aqueous solution containing both salts and salt impurities, the solubility of the first salt increasing more with increasing temperatures than the solubility of the second salt, at least a portion of the salt impurities precipitating as crystals with a slower settling rate than that of precipitated second salt, by passing the solution through a series of evaporators, wherein second salt and salt impurities are precipated in each evaporator, and wherein the bottom of each evaporator communicates with an elutriation leg, introducing fluidizing liquid upwardly through the elutriation legs to carry the salt impurities back to the evaporators while the second salt settles, withdrawing second salt slurry from each elutriation leg, purging from the evaporation system second salt slurry withdrawn from at least one but not all evaporators, forwarding mother liquor effluent overflow from the series of evaporators to a first salt recovery step, and utilizing first salt depleted mother liquor effluent from the first salt recovery step as the fluidizing liquid introduced into the elutriation leg communicating with the evaporator from which withdrawn second salt slurry is purged from the series of evaporators, the improvement which comprises utilizing as elutriating liquid for an evaporator into which the first salt recovery step mother liquor effluent is not introduced evaporator mother liquor effluent overflow having a temperature and salt composition near the temperature and salt composition of the solution in the evaporator which communicates with the elutriation leg into which the elutriating liquid is introduced.

7. The method of claim 6, wherein the first salt is potassium chloride and the second salt is sodium chloride.

8. The method of claim 6, wherein the series of evaporators is multiple effect evaporators operated at progressively higher temperatures, wherein the multiple effect evaporators are backward fed, wherein the 1st evaporator effect is the hottest, wherein the mother liquor effluent overflow from the 2nd evaporator effect is introduced into the elutriation leg communicating with the hottest evaporator effect as the fluidizing liquid and wherein second salt slurry withdrawn from the second hottest evaporator effect is purged from the evaporation system.

9. The method of claim 6, wherein the purged second salt is forwarded to a second salt recovery step.

10. In the method of separating potassium chloride and sodium chloride from an aqueous solution containing both salts and salt impurities taken from the group consisting essentially of calcium sulfate, magnesium chloride, calcium chloride, sodium sulfate, sodium carbonate, and magnesium sulfate, by passing the solution through multiple effect evaporators operated at progressively higher temperatures, wherein each evaporator effect comprises an evaporator communicating with an elutriation leg, wherein the multiple effect evaporators are backward fed, wherein sodium chloride and a portion of the salt impurities are precipitated in each evaporator effect, wherein fluidizing liquid is introduced upwardly through the elutriation legs to carry the precipitated impurities back into the evaporator while precipitated sodium chloride settles, wherein sodium chloride slutty is withdrawn from each elutriation leg and sodium chloride slurry withdrawn from at least one but not all evaporators is purged from the multiple effect evaporator system, wherein potassium chloride mother liquor effluent from the evaporators is forwarded to a potassium chloride recovery step, and wherein potassium chloride depleted mother liquor effluent from the potassium chloride recovery step is utilized as the fluidizing liquid introducing into the elutriation leg communicating with the evaporator from which withdrawn sodium chloride slurry is purged from the multiple effect evaporator system, the improvement which comprises utilizing as fluidizing liquid for an evaporator into which potassium chloride recovery step mother liquor effluent is not introduced evaporator mother liquor effluent overflow having a temperature and salt composition near the temperature and salt composition of the solution in the evaporator which communicates with the elutriation leg into which the fluidizing liquid is introduced.

11. The method of claim 10, wherein the multiple effect evaporators comprise four evaporator effects, wherein the 1st evaporator effect is the hottest, wherein the mother liquor effluent overflow from the 2nd evaporator effect is utilized as the fluidizing liquid introduced into the elutriation leg communicating with the 1st evaporator effect, wherein the sodium chloride slurry withdrawn from the 2nd evaporator effect is purged from the multiple effect evaporator system, and wherein the sodium chloride slurry withdrawn from the 1st evaporator effect is recycled to the 2nd evaporator effect.

12. The method of claim 11, wherein the sodium chloride purged from the multiple effect evaporator system is forwarded to a sodium chloride recovery step.

13. The method of claim 11, wherein the 1st effect evaporator mother liquor effluent overflow is forwarded to an impurity separation step before being forwarded to the potassium chloride recovery step.

* * * * *